United States Patent [19]
Witt

[11] Patent Number: 5,960,843
[45] Date of Patent: Oct. 5, 1999

[54] TEMPLATE AND WORKPIECE HOLDER AND METHOD FOR USING SAME

[75] Inventor: Bradley R. Witt, Davenport, Iowa

[73] Assignee: Witt Family Partnership LP, Durant, Iowa

[21] Appl. No.: 09/193,958

[22] Filed: Nov. 18, 1998

[51] Int. Cl.[6] .............................. B27M 3/00; B27C 1/12
[52] U.S. Cl. ................ 144/372; 144/144.51; 144/145.1; 144/145.2; 269/55; 269/246; 409/130
[58] Field of Search .............................. 144/137, 144.51, 144/145.1, 145.2, 145.3, 371, 372; 269/55, 56, 216, 240, 246; 409/125, 130

[56] References Cited

U.S. PATENT DOCUMENTS 2,507,982  5/1950  Krause ................................. 144/145.2
4,644,985  2/1987  Weaver ................................. 144/145.1

*Primary Examiner*—W. Donald Bray
*Attorney, Agent, or Firm*—Zarley, McKee, Thomte, Voorhees & Sease

[57] ABSTRACT

A workpiece holder includes a template and a pair of slide blocks mounted to the template for slideable movement with respect to the template. The slide blocks and the template can be mounted to a base plate or can be mounted to each other without the use of a base plate. The slide blocks include straight edge surface and L-shaped notched surface which can be reversed to accommodate templates and workpieces of varying shapes.

15 Claims, 8 Drawing Sheets

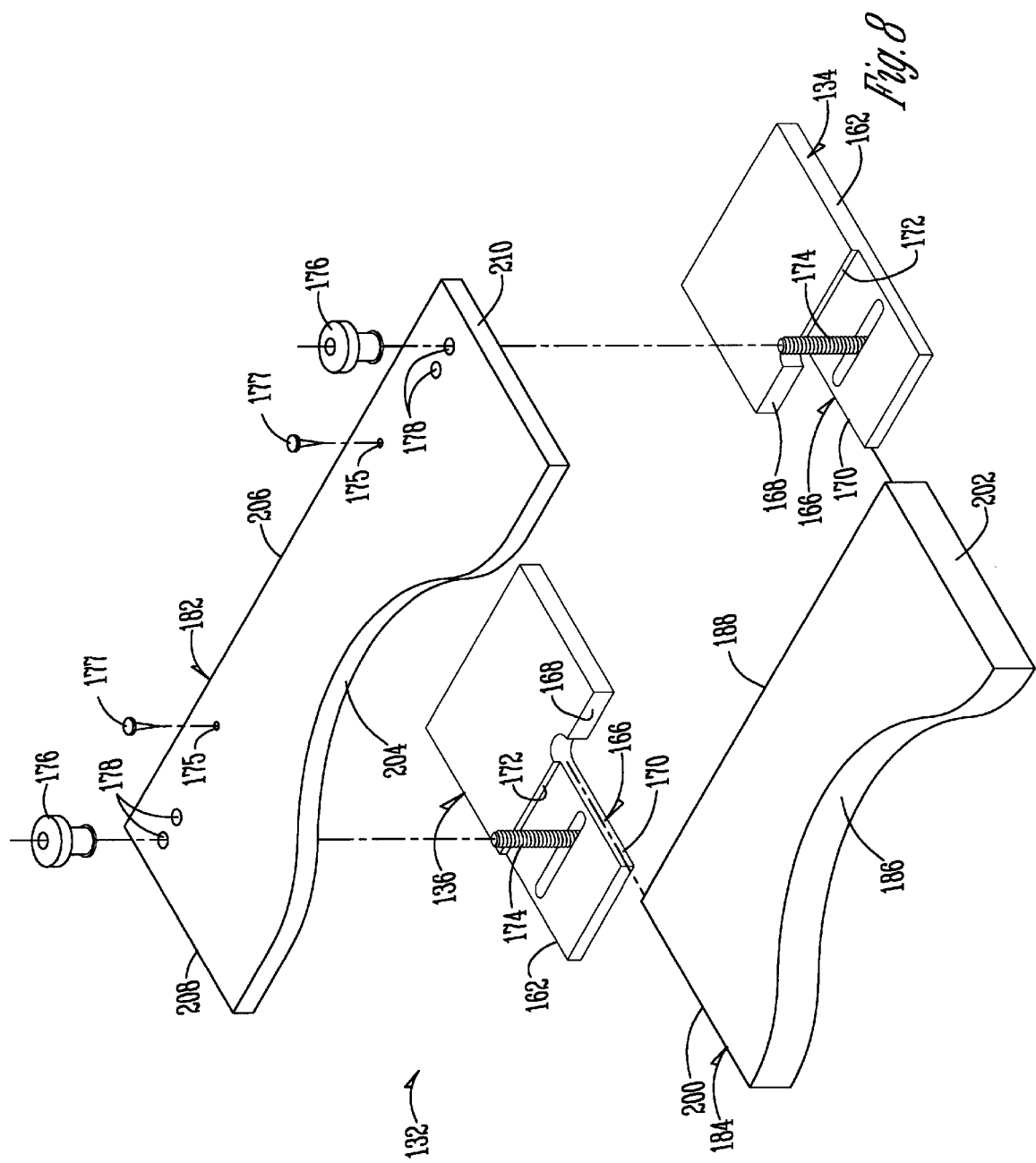

5,960,843

TEMPLATE AND WORKPIECE HOLDER AND METHOD FOR USING SAME

BACKGROUND OF THE INVENTION

The present invention relates to a template and workpiece holder and method for using same.

In woodworking, when making doors or other types of framed objects, templates are often used for guiding a router or shaper to shape the edges of the door panels, and the door rails. In the use of these templates there is need for a reliable and economical holder for holding both the door panels or rails and the templates during the routing or shaping operation. An example of a prior art holder for this purpose is shown in U.S. Pat. No. 4,644,985. This holder provides means for holding the workpiece and the template and for guiding the workpiece relative to a shaper or router bed so as to provide the appropriate shape for the edge of the workpiece. The device shown in U.S. Pat. No. 4,644,985 is very complicated and expensive, and there is need for a simpler, less expensive holder then shown in this prior art patent.

Therefore, a primary object of the present invention is the provision of an improved template and workpiece holder and method for using same.

A further object of the present invention is the provision of an improved template holder which is simpler and more economical to manufacturer than prior art devices.

A further object of the present invention is the provision of an improved template and workpiece holder which permits the workpiece to be moved into registration with the template for use.

A further object of the present invention is the provision of an improved template and workpiece holder which does not require separate construction for both the shaping of a door panel edge and the shaping of a door rail edge.

A further object of the present invention is the provision of an improved template and workpiece holder which includes sliding blocks that can be reversed for use with different types of templates.

A further object of the present invention is the provision of an improved template and workpiece holder which includes sliding blocks capable holding the workpiece against movement into orthogonal directions relative to the template.

A further object of the present invention is the provision of an improved template and workpiece holder which is economical to manufacture, durable in use and efficient in operation.

SUMMARY OF THE INVENTION

The foregoing objects may be achieved by the invention, which in its simplest form includes a template having first and second end edges, a forward guide edge for guiding a cutting tool relative to a workpiece, and a rear edge. First and second sliding blocks are provided each including a front edge, a rear edge, first and second side edges, and upper surface, and a lower surface. The upper surface includes a straight edge shoulder. First and second locking members mount the first and second sliding blocks to the template and are movable from an unlocked position permitting relative sliding movement between the template and the sliding blocks to a locked position preventing relative movement between the template and the sliding blocks. The straight edge shoulders of the first and second sliding blocks engage the rear edge of the template and slide there along to maintain the first and second slide blocks in a predetermined rotational orientation during sliding movement with respect to the template. In one form of the invention straight side edge portions of the sliding blocks engage the workpiece so as to permit the workpiece to slide parallel to the side edges of the slide box.

The sliding blocks are reversible however to provide L-shaped notches facing the workpiece so that the notches engage both the side edges and the rear edges of the workpiece to properly position the workpiece relative to the template.

In another embodiment of the invention, slide blocks having essentially the same shape are used, but a base plate is added. The sliding blocks are slideably mounted on the base plate, and the workpiece is positioned on the base plate between the sliding blocks. The sliding blocks are reversible in the same fashion as described above for the more simplified embodiment. In this second embodiment the template is immovably mounted with respect to the base plate whereas the sliding blocks and the workpiece are slideably movable with respect to the base plate and the template.

BRIEF DESCRIPTION OF THE FIGURES OF THE DRAWINGS

FIG. 3A is a side elevational view taken along line 3A—3A of FIG. 3.

FIG. 8 is an exploded perspective view of the device shown in FIG. 7, showing the slide blocks reversed for accommodating a door rail.

DETAILED DESCRIPTION OF THE PREFERRED EMBODIMENT

Figure 1:
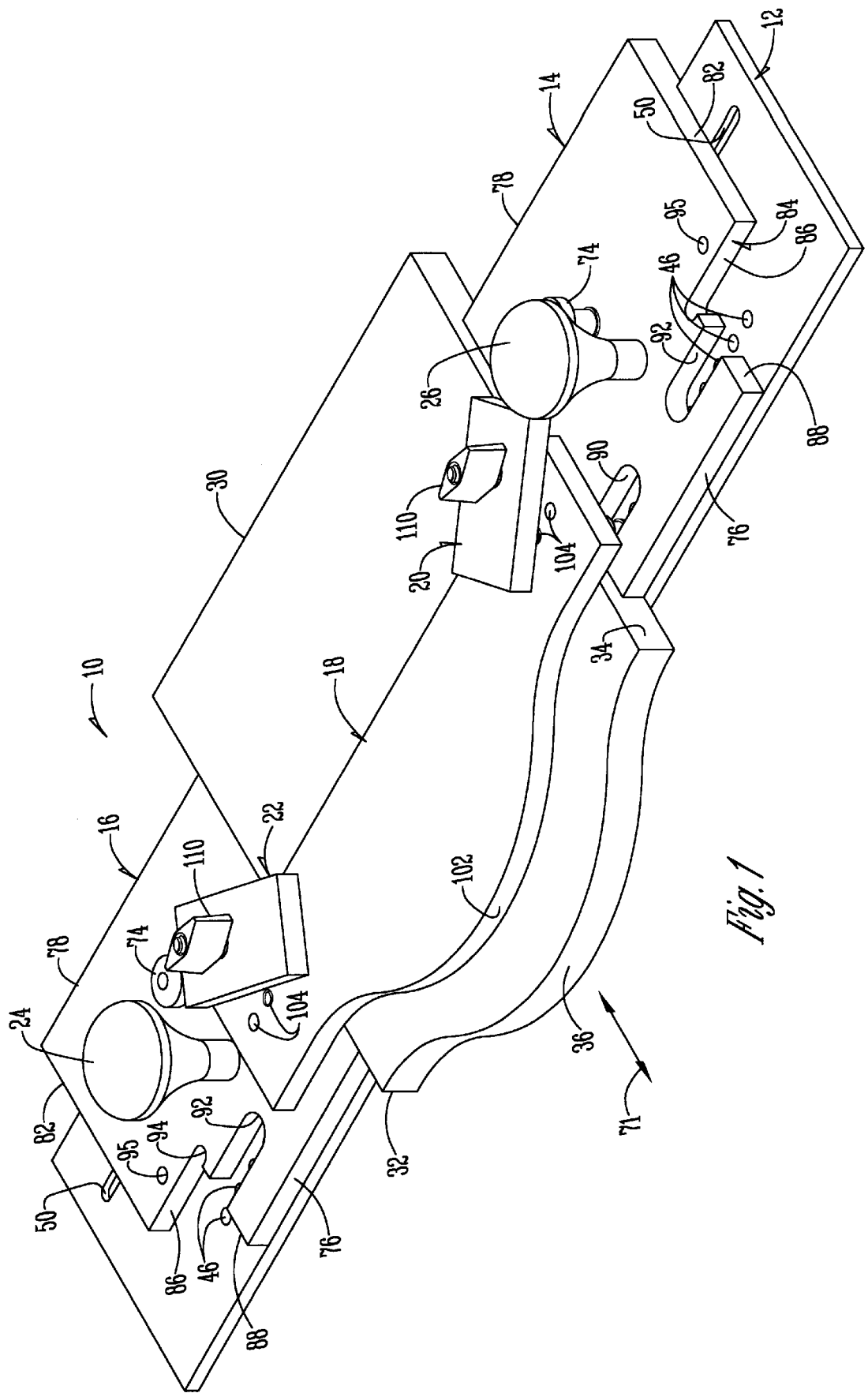
FIG. 1 is a perspective view of preferred embodiment of the present invention.

Referring to FIG. 1–4, a template and workpiece holder 10 is shown and includes a base plate 12, slide plates 14, 16, a template 18, clamp assemblies 20, 22, and handles 24, 26. A door panel workpiece 28 is shown for use with the holder 10. Workpiece 28 includes a rear edge 30, opposite side edges 32, 34, and a front edge 36 which represents the top of the door panel and which is usually curved to predetermined configuration.

Figure 4:
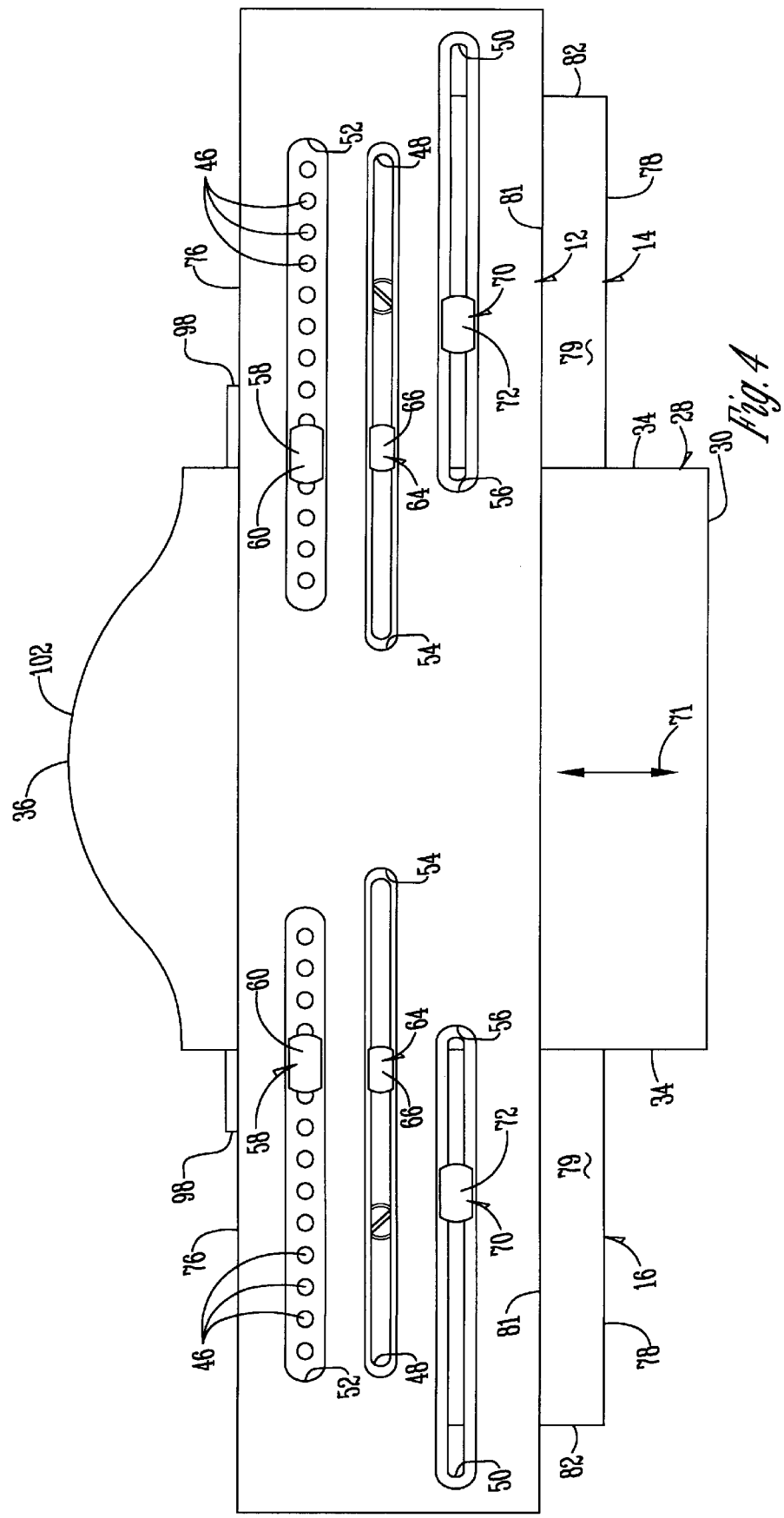
FIG. 4 is a bottom plan view of the embodiment shown in FIG. 1.

Base 12 includes a front edge 38, a back edge 40, and edges 42, 44. A row of indexing holes 46 is provided along the front edge 38 of the base plate 12. Also extending parallel to the row of indexing holes 46 is a clamp slot 48 and a slide block slot 50. Referring to FIG. 4, the bottom surface of base plate 12 includes an elongated indexing channel, an elongated clamp channel and an elongated slide block channel. Template bolts 58 extend through the holes 46 and have their heads 60 slideably mounted within the indexing channel 52. The shanks 62 of bolts 58 extend upwardly through the holes 46 and a adapted to receive the template 18 in a manner to be described hereafter. Bushings 63 are provided on the shanks 60 above the base plate 12.

A pair of clamp bolts 64 extend upwardly through clamp slot 48 and include heads 66 slideably fitted within the clamp channel 54. Bolts 64 include shanks 68 which extend upwardly above the upper surface of base plate 12.

A pair of slide block bolts 70 include a head 72 fitted within slide block channel 56 for sliding movement in channel 56. Slide block bolts 70 include shanks (not shown) extending upwardly through grooves 50 and having nuts 74 threadably mounted thereon.

Slide plates or blocks 14, 16 are mounted on the upper surface of the base plate 12 for sliding movement thereon. Slide plates 14, 16 each include a front edge 76, a rear edge 78, a straight side edge 80 and a notched side edge 82. The notched side edges 82 include L-shaped notches 84 each having a first leg 86 and a second leg 88. Slide plates 14, 16 also include first and second indexing grooves 90, 92 for engaging the bushing 63 of shanks 62 of the template bolts 58. Slide plates 14, 16 also include template grooves 94 located at the juncture between first and second legs 86, 88 of L-shaped notch 84. A pair of spaced apart holes 95 are provided in the sliding blocks 14, 16 for receiving the shanks 68 of clamp bolts 64.

Template 18 includes a rear edge 96, a pair of end edges 98, 100 and a front guide edge 102 is shaped to conform to the desired shape of the top edge of the door panel workpiece 28. Template 18 is provided with two or more holes 104 for receiving the shanks 62 of template bolts 58.

Clamps 20, 22 each comprise a clamping plate 106 having a hole 108 therein for receiving the shanks 68 of clamp bolts 64. Nuts 110 are threadably mounted upon the shanks 68.

Figure 2:
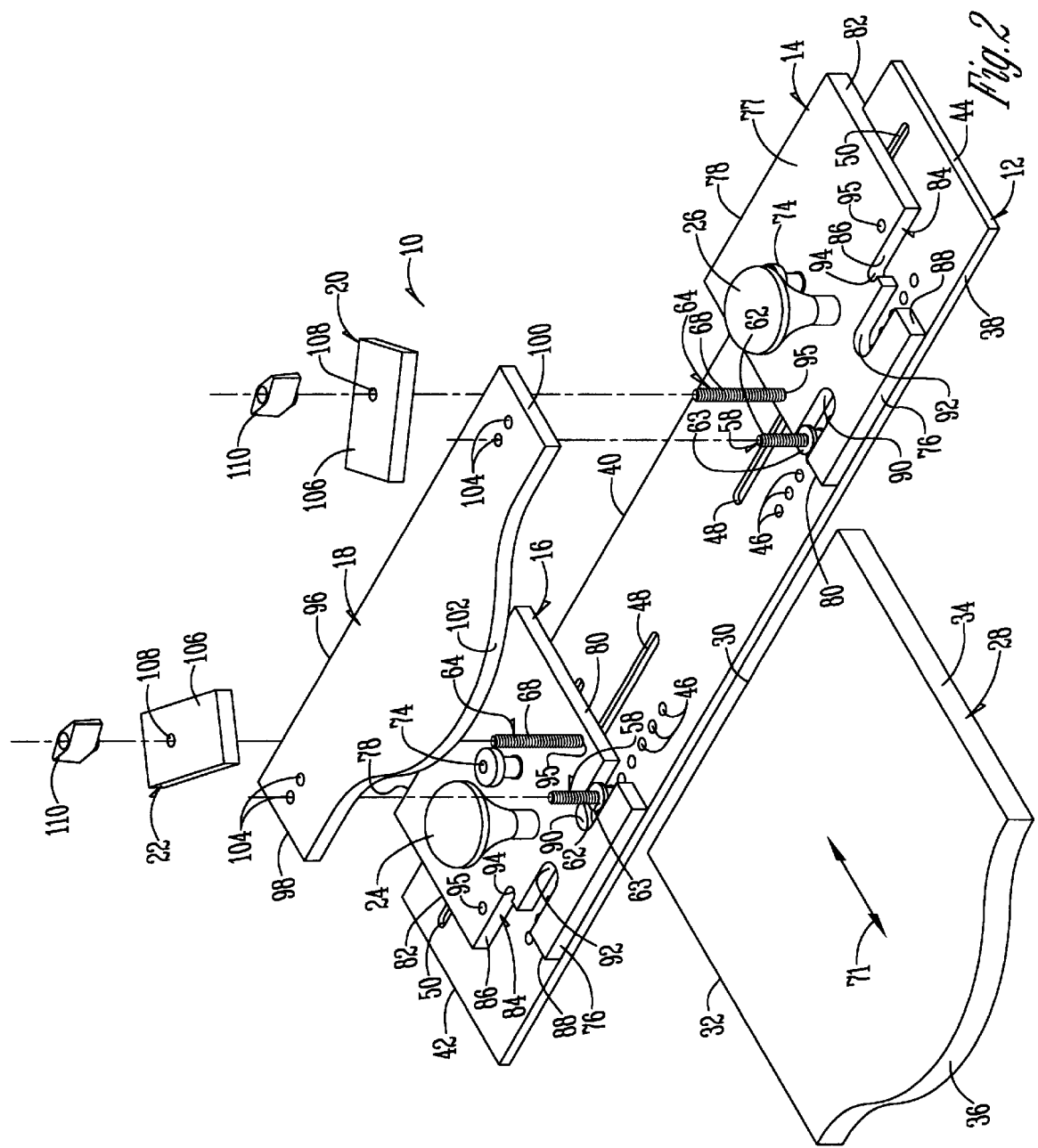
FIG. 2 is an exploded perspective view of the embodiment shown in FIG. 1.
Figure 3:
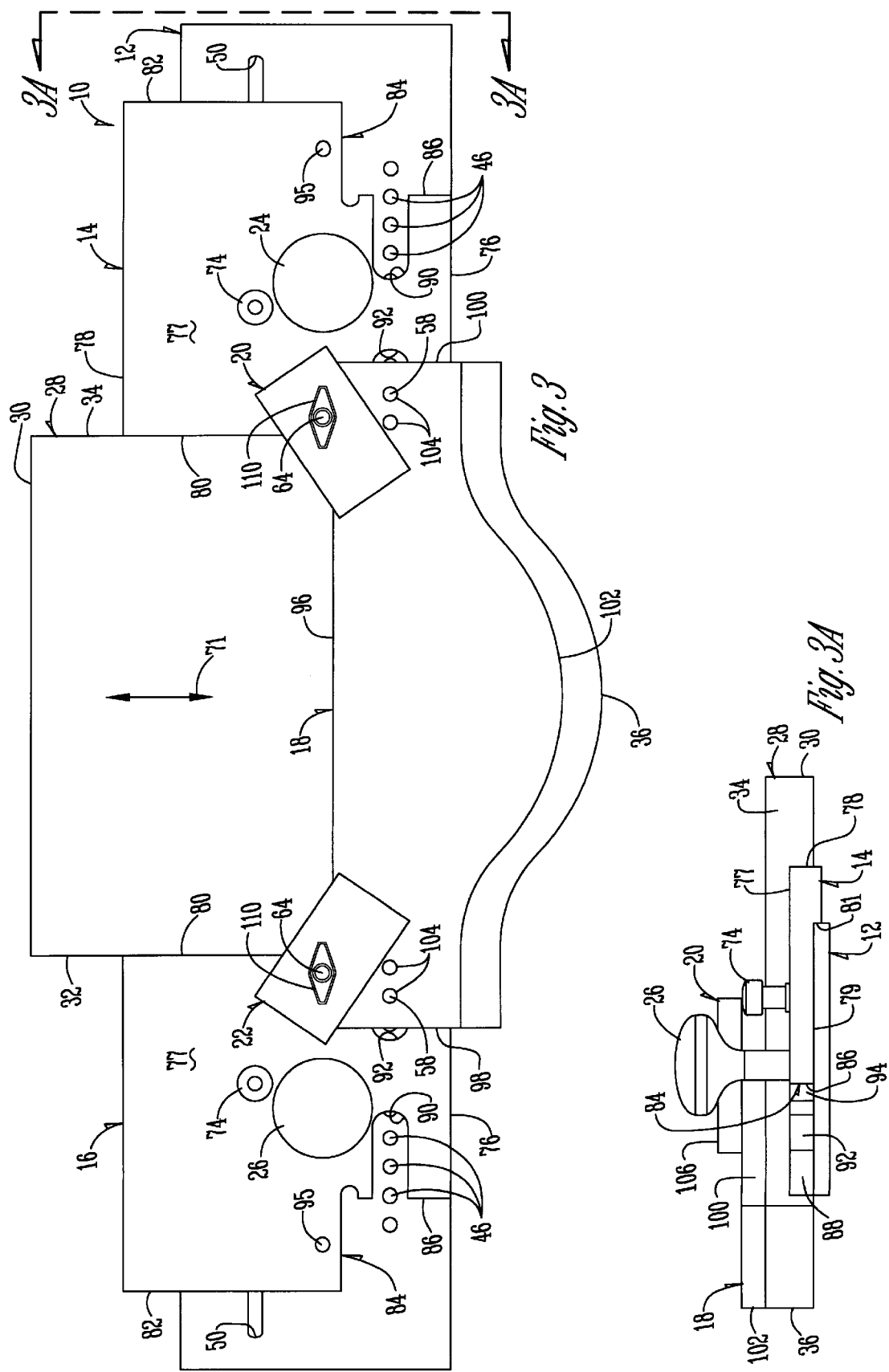
FIG. 3 is a top plan view of the embodiment shown in FIG. 1.

In operation, the slide blocks 14, 16 are mounted on the base plate 12 in the manner shown in FIG. 2. The straight side edges 80 are faced toward one another. Nuts 74 are loosened as are the nuts 110 of the clamps 20, 22. This permits the slide blocks 14, 16 to slide longitudinally on base plate 12 with the slide block bolts 70 sliding in grooves 50. The bushings 63 are fixed relative to the base plate 12, but are free to slide within first indexing groove 90 of the slide plate 14, 16.

The workpiece 28 is positioned between the two slide plates 14, 16 with the side edges 32, 34 of the workpiece 28 sliding against the straight edges of slide plates 14, 16. The slide plates 14, 16 are moved toward one another so that they embrace the opposite sides 32, 34 of the workpiece 36 as shown in FIG. 1.

Next the template 18 is mounted over the shanks 62 of template bolts 58 and is permitted to slide down into engagement with the upper surface of the workpiece 36 as shown in FIG. 1. With the slide plates 14, 16 still loose, the workpiece 28 is free to slide longitudinally in the direction indicated by arrows 71 until the front edge 36 is registered with the front edge 102 of template 18. The front edge 36 is precut to generally conform to the front edge 102. Sliding movement of the slide blocks 14, 16 permits the centering of the workpiece 28 relative to the template 18, and sliding movement of the workpiece in the direction indicated by arrows 71 permits the workpiece 28 to be moved in registration with the front edges 102 of the template and 36 of the workpiece in registered alignment.

The nuts 74, 110 are then tightened down so that the slide blocks are held against movement and so that the clamps 20, 22 are clamped downwardly on the template. Because the template is slideably mounted over the shanks 62 of the template bolts 58, the tightening of the nuts 110 causes the workpiece 28 also to be held against movement with respect to the holder 10.

The slide blocks 14, 16 each include a top surface 77 and a bottom surface 79 which is provided with a forwardly facing guide shoulder 81 that slides against the rear edge 40 of the base plate 12.

The operator then simply grasps handles 24, 26 and moves the entire holder 10 with the workpiece 28 clamped thereto on to the work surface of a router or shaper table (not shown). The base plate 40 is permitted to slide on the work surface of the router or shaper table, and the template 18 guides against a guide collar on the shaper or router bit. This permits the shaper or router bit to engage and properly shape the surface 36 of the workpiece 28.

Figure 5:
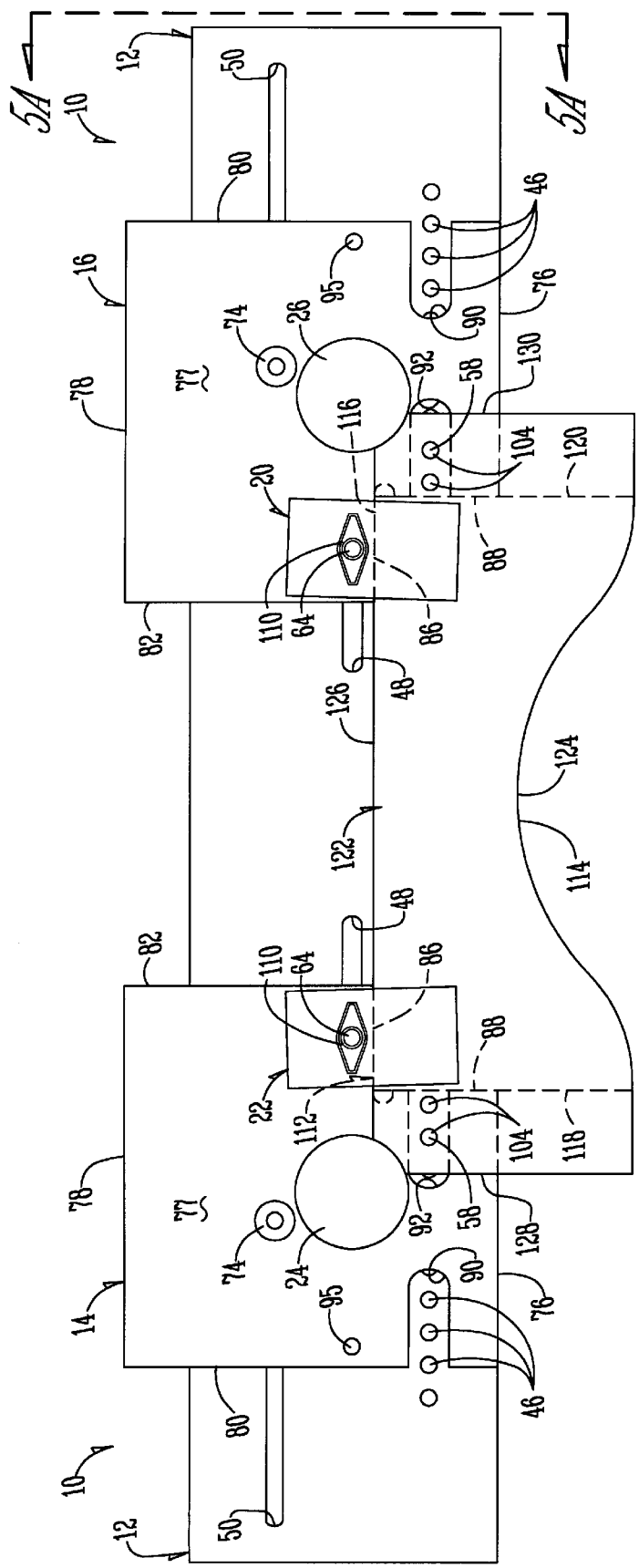
FIG. 5 is a top plan view of the embodiment shown in FIG. 1, but having the slide blocks reversed to accommodate a door rail template and workpiece.
Figure 5A:
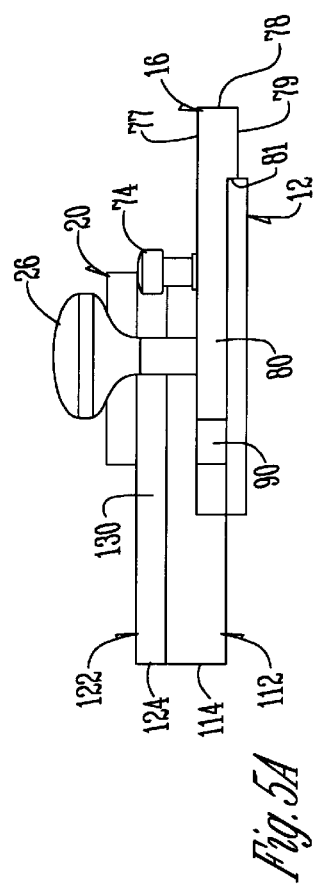
FIG. 5A is a side elevational view taken along line 5A—5A of FIG. 5.
Figure 6:
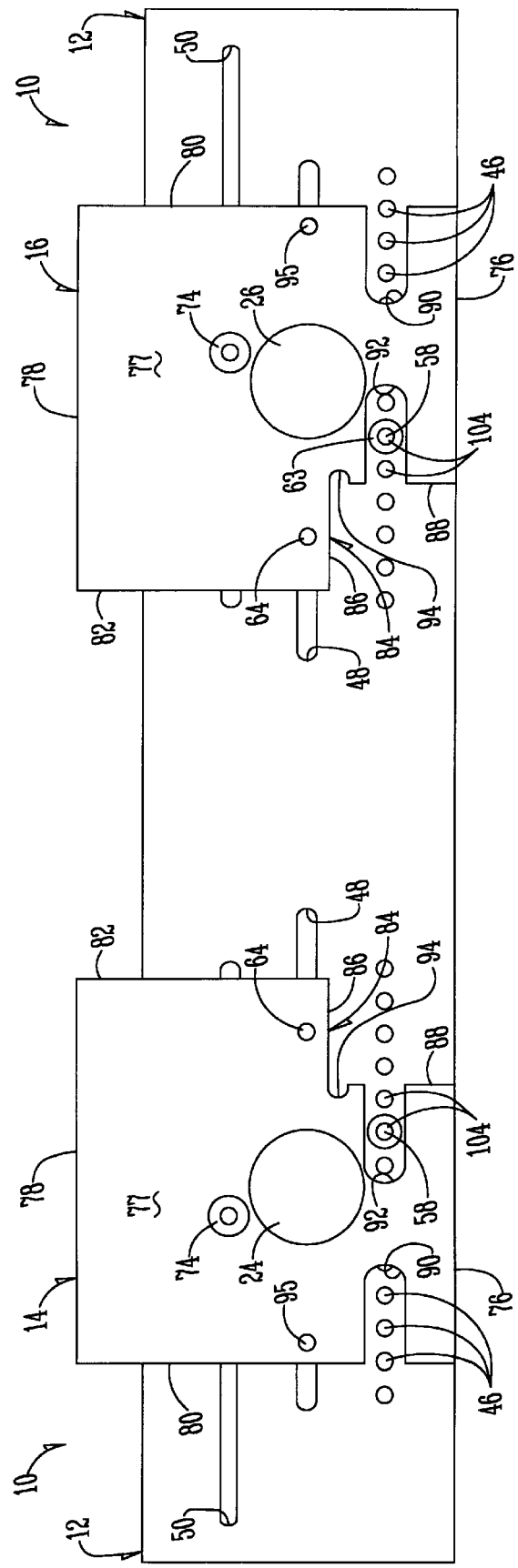
FIG. 6 is a view similar to FIG. 5 but showing the template and workpiece removed.

FIGS. 5 and 6 show the use of the holder 10 for holding a door rail workpiece 112 rather than the door panel workpiece 36 shown in FIGS. 1–4. The door rail workpiece includes a front edge 114, a rear edge 116, and end edges 118, 120.

A rail template 122 is used in the place of door panel template 18 and includes a first guide edge 124, a rear edge 126, and end edges 128, 130.

The slide blocks 14, 16 are reversed from the position shown in FIGS. 1–4. This places the notched side edges 82 to a position wherein they face inwardly toward one another and the straight edges 80 face outwardly.

The slide blocks 14, 16 are moved toward and away from one another until the first legs 86 of the L-shaped notches 84 engage the end edges 120 of the door panel rail workpiece 112. The door panel workpiece 112 is then moved rearwardly until the rear edge 126 thereof engages the second legs 86 of the L-shaped notches 84. This positions the door panel rail 112 both in a forward rear direction and in a side to side direction relative to the template 122. The slide blocks 14, 16 can be moved until the workpiece 112 is centered with respect to the template 122.

Figure 7:
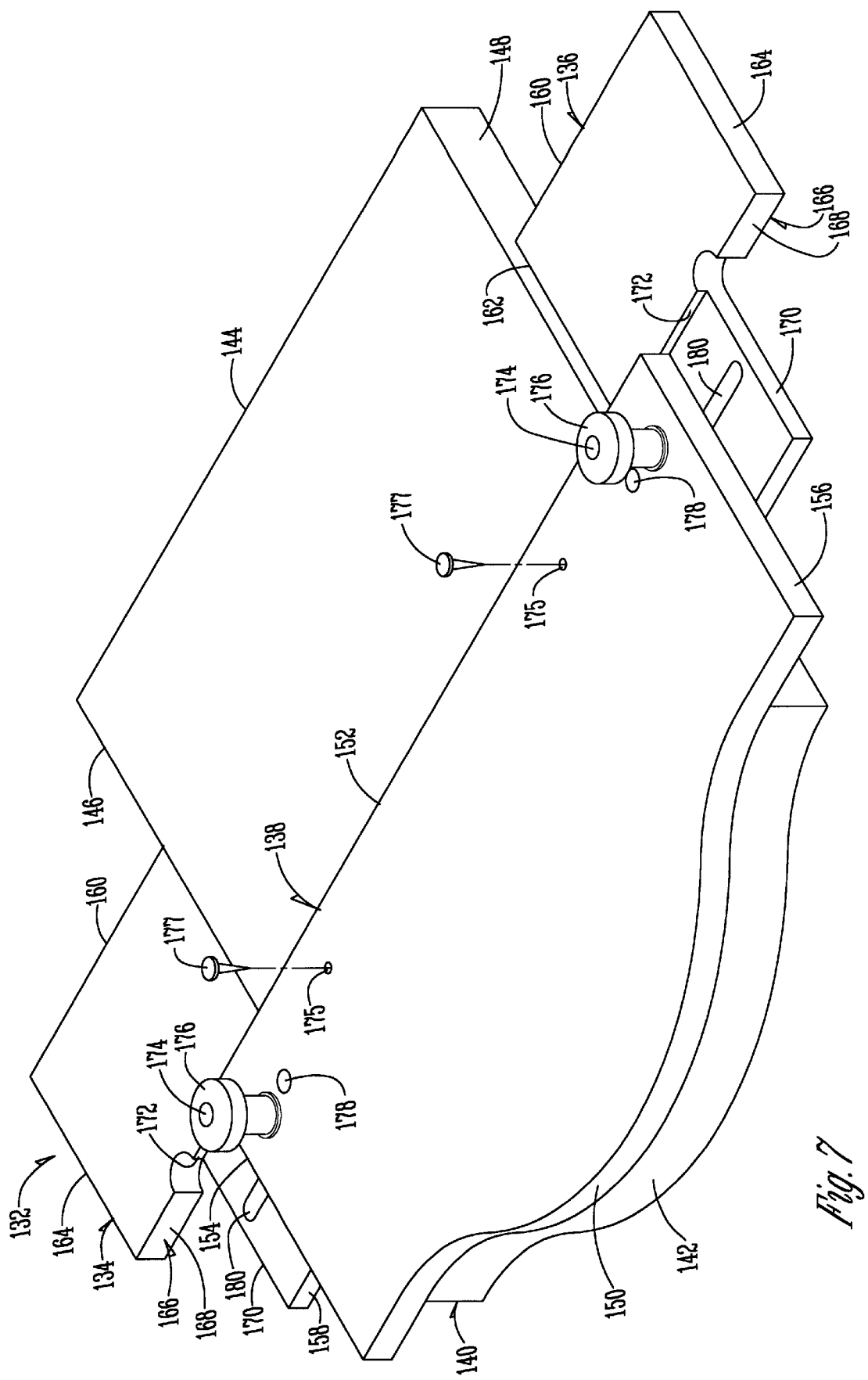
FIG. 7 is a perspective view of a modified and simplified embodiment of the present invention.

Referring to FIGS. 7 and 8 a simplified holder 132 is shown. Holder 132 includes a pair of slide blocks 134, 136 and a door panel template 138.

A door panel workpiece 140 includes a front edge 142, a rear edge 144 and opposite side edges 146, 148.

The template 138 includes a front guide edge 150, a rear edge 152 and opposite end edges 154, 156.

The slide blocks 134, 136 each include a front edge 158, a rear edge 160, a straight side edge 162 and a notched side edge 164. Notched side edge 164 includes an L-shaped notch 166 having a first leg 168 and a second leg 170 disposed perpendicular to one another. A guide shoulder 172 extends along the upper surface of each of the slide blocks 134, 136.

A template bolt 174 extends upwardly through a guide slot 180 in each of the slide blocks 134, 136 and extends through bolt holes 178 of template 138. A nut 176 is threaded over the upper surface thereof and when tightened, nut 176 holds the slide blocks 134, 136 against movement relative to the template 138.

In operation, the nuts 176 are loosened so as to permit the slide blocks 134, 136 to slide longitudinally relative to the template 138. The shoulders 172 on slide blocks 134, 136 bear against the rear edge 152 of the template 138 so as to orient the slide blocks 134, 136 properly. Slots 180 also provide guidance to the bolt shanks 174 during this sliding movement. The slide blocks are moved until the straight edges 162 are in engagement with the side edges 146, 148 of workpiece 140. The workpiece 140 is then moved to a position wherein the front edge 142 of the workpiece 140 is registered with the front guide edge 150 of template of 136. This involves sliding movement of the workpiece from front to rear and also involves sliding movement of the slide blocks 134, 136 relative to the template 138 so as to center the guide edge 150 of template 158 with the front edge 142 of the workpiece 140. Then nuts 176 are tightened down and tacks or screws 177 may be inserted through optionally provided tack or screw holes 175 into the workpiece 140 to hold the template to the workpiece.

Holder 132 functions in much the same manner as holder 10, but does not utilize base plate which holder 110 utilizes. The slide plates 134, 136 can be reversed to accommodate a door panel rail in the manner shown in FIG. 8.

As shown in FIG. 8, the holder 132 is shown adapted for use with a rail template 182 and a rail workpiece 184. The rail workpiece includes a front edge 186, a rear edge 188, and opposite end edges 200, 202.

The template 182 includes a front guide edge 204, a rear edge 206 and opposite end edges 208, 210.

The slide blocks 134, 136 are reversed from the position shown in FIG. 7, so that the L-shaped notches 166 are positioned facing one another and the straight edges 162 are positioned facing away from one another. The template 182 is secured to the slide blocks 134, 136 by means of nuts 176 threaded over bolts 174. In this position the rear edge 206 of rail 182 slides against the guide shoulders 172 of slide blocks 134, 136. The rear edge 188 of the workpiece 184 fits against the legs 168 of the slide blocks 134, 136 so as to limit its rearward movement relative to the slide blocks 134, 136. The end edges 200, 202 of the workpiece bear against the legs 170 of the L-shaped notches 166 as shown in FIG. 8. Thus the legs 168, 170 position the workpiece 184 both in a right to left position and in a front to back position relative to the template 182. The slide blocks 134, 136 and the workpiece 184 can be moved longitudinally relative to the template 182 until proper registration of the surfaces 186, 204 is obtained. Then the nuts 176 are tightened down and tacks or nails 212 are inserted through tack or nail holes 214 and inserted into the workpiece 184 to hold the holder 132 to the workpiece 134. The combined holder 132 and the workpiece 184 can then be used on a router or shaper table to shape the front edge 186 of the workpiece 184.

In the drawings and specification there has been set forth a preferred embodiment of the invention, and although specific terms are employed, these are used in a generic and descriptive sense only and not for purposes of limitation. Changes in the form and the proportion of parts as well as in the substitution of equivalents are contemplated as circumstances may suggest or render expedient without departing from the spirit or scope of the invention as further defined in the following claims.

What is claimed is:

1. In combination:
    a workpiece having upper and lower flat surfaces, first and second opposite side edges, a front edge, and a rear edge;
    a base having a flat upper surface;
    first and second slide blocks embracing the workpiece therebetween, each of the slide blocks being mounted to the base for sliding movement thereon;
    a first stop member engaging both the first sliding block and the base;
    a second stop member engaging both the second sliding block and the base;
    each of the first and second stop members being selectively movable from a locked position holding the first and second sliding blocks and the workpiece embraced therebetween against sliding movement relative to the base to an unlocked position permitting sliding movement of the first and second sliding blocks and the workpiece embraced therebetween relative to the base;
    a template;
    a template holder mounting the template to the base and holding the template against movement with respect to the base during sliding movement of the blocks and the workpiece.

2. A combination according to claim 1 and further comprising a first clamp mounted on the first sliding block and a second clamp mounted on the second sliding block, the first and second clamps each being movable from an unclamped position permitting movement of the workpiece relative to the slide blocks, the base, and the template, to a clamped position holding the workpiece against relative movement with respect to slide blocks, the base, and the template.

3. A combination according to claim 2 wherein the template is positioned above the workpiece and engages the upper surface thereof.

4. A combination according to claim 3 wherein the clamps engage the template and clamp the workpiece between the template and the base when the clamps are in their clamped position.

5. A combination according to claim 1 wherein the workpiece includes first and second side edges, a front edge, and a rear edge, the slide blocks each having a substantially straight edge and being in a first position wherein the straight edges of said slide blocks each slideably engage one of the first and second side edges of the workpiece and embrace the workpiece therebetween so as to permit the workpiece to slide in a direction parallel to the straight edges of the slide blocks.

6. A combination according to claim 5 wherein the workpiece is a door panel, and handles are connected to the base for moving the front edge of the door panel into engagement with a tool for shaping the front edge of the door panel.

7. A combination according to claim 5 wherein the slide blocks each include a notched edge containing a first leg edge and a second leg edge, the slide blocks being rotatable from their first position to a second position wherein the notched edges engage the workpiece with the first leg edges engaging the side edges of the workpiece and the second leg edges engaging the rear edge of the workpiece.

8. A combination according to claim 7 wherein the workpiece is a door rail intended for attachment to an edge of a door panel, and handles are connected to the base for moving the front edge of the door rail into engagement with a tool for shaping the front edge of the door rail.

9. In combination:
    a template having first and second end edges, a forward guide edge for guiding a cutting tool relative to a workpiece, and a rear edge;
    a first sliding block and a second sliding block each having a front edge, a rear edge, a first side edge, a second side edge, an upper surface and a lower surface, the upper surface having a straight edge shoulder;
    first and second locking members mounting the first and second sliding blocks to the template, the mounting members being movable from an unlocked position permitting relative sliding movement between the template and the sliding blocks, to a locked position preventing relative movement between the template and the sliding blocks;

the straight edge shoulders of the first and second sliding blocks engaging the rear edge of the template to maintain the first and second slide blocks in a predetermined rotational orientation during sliding movement with respect to the template with portions of the first side edges of the first and second sliding blocks being parallel to and facing one another.

10. A combination according to claim 9 and further comprising a workpiece having first and second opposite side edges, a rear edge, a front edge, an upper surface, and a lower surface, the first and second sliding blocks engaging the first and second side edges of the workpiece, the forward guide edge of the template being positioned adjacent the front edge of the workpiece.

11. A combination according to claim 10 wherein the first side edges of the first and second sliding blocks are substantially straight along their entire lengths, the second side edges of the first and second sliding blocks each having an L-shaped notch formed therein comprising a first leg and a second leg extending approximately perpendicular with respect to one another.

12. A combination according to claim 11 wherein the first and second sliding blocks are reversible with respect to one another from a first position wherein the first side edges thereof engage the first and second side edges of the workpiece to a second position wherein the second side edges thereof engage the workpiece with the first legs engaging the first and second side edges of the workpiece and the second legs engaging the rear edge of the workpiece.

13. A method for holding and moving a workpiece having first and second opposite side edges, a rear edge, and a front edge intended for engagement with a cutting tool having a guide collar thereon, the method comprising:

taking a template having a guide edge of predetermined shape for guiding the workpiece relative to the cutting tool;

pre-shaping the front edge of the workpiece to conform generally with the guide edge of the template;

placing the workpiece between a first slide block and a second slide block, the first and second slide blocks being connected either directly or indirectly to the template for sliding movement with respect thereto;

moving the workpiece and the first and second slide blocks relative to the template to position the guide edge of the template adjacent to and in approximate registration with the front edge of the workpiece;

moving the first and second secured slide blocks, template, and workpiece into engagement with the cutting tool with the guide edge of the template engaging and being guided against the guide collar of the cutting tool.

14. A method according to claim 13 wherein the first and second slide blocks each include a straight edge which is straight along its entire length, the method further comprising placing the straight edges of the first and second slide blocks in engagement with the first and second opposite side edges respectively, of the workpiece, the moving step comprising sliding the workpiece parallel to the straight edges of the first and second slide blocks and moving the first and second slide blocks and the workpiece in a direction perpendicular to the straight edges of the workpiece.

15. A method according to claim 14 wherein the first and second slide blocks each include an L-shaped notch which includes first and second legs disposed perpendicular to one another, the method comprising reorienting the first and second slide blocks so that the first legs of the L-shaped notches are in engagement with the rear edge of the workpiece and the second legs of the L-shaped notches are in engagement with the first and second side edges of the workpiece respectively.

\* \* \* \* \*